(12) United States Patent
McNaught et al.

(10) Patent No.: US 6,429,432 B1
(45) Date of Patent: Aug. 6, 2002

(54) GAMMA RADIATION ISOLATION SHIELD AND METHOD OF USE

(75) Inventors: Colin J. McNaught, Annapolis, MD (US); Douglas Arthur Kieper, Norfolk, VA (US); Benjamin Lawrence Welch, Hampton, VA (US); Lee Holland Fairchild, Poquoson, VA (US)

(73) Assignee: Dilon Technologies, Inc., Newport News, VA (US)

( * ) Notice: Subject to any disclaimer, the term of this patent is extended or adjusted under 35 U.S.C. 154(b) by 0 days.

(21) Appl. No.: 09/449,787

(22) Filed: Nov. 26, 1999

(51) Int. Cl.[7] .................. G01T 1/161; G01T 1/164; G01T 1/24; H01L 25/00; H01L 27/00
(52) U.S. Cl. .................. 250/363.02; 250/370.09
(58) Field of Search .............. 378/37, 203; 250/363.08, 250/363.02, 370.09, 505.1, 515.1; 252/478

(56) References Cited

U.S. PATENT DOCUMENTS

| | | | | |
|---|---|---|---|---|
| 965,533 A | * | 7/1910 | Meyers | 378/37 |
| 3,723,743 A | * | 3/1973 | Brackenbrough et al. | 250/515.1 |
| 3,986,036 A | * | 10/1976 | Harper et al. | 250/515.1 |
| 4,090,084 A | * | 5/1978 | Epstein et al. | 250/505.1 |
| 4,852,142 A | * | 7/1989 | Pillay et al. | 250/363.02 |
| 5,602,395 A | * | 2/1997 | Nelleman et al. | 250/363.03 |
| 5,889,316 A | * | 3/1999 | Strobel et al. | 250/515.1 |
| 6,237,338 B1 | * | 12/2001 | Golovanisky et al. | 378/119 |

* cited by examiner

*Primary Examiner*—Georgia Epps
*Assistant Examiner*—Alicia M Harrington

(57) ABSTRACT

An adjustable gamma radiation isolation shield that effectively shields the gamma camera from potentially interfering radiation emitted from sources other than the particular anatomical portion under examination. The shield is placed adjacent to the breast or other body portion under examination on the side thereof opposite that addressed by the gamma camera i.e., at about 90° to the viewing angle of the camera. The shield includes a first gamma ray permeable layer capable of absorbing fluorescent low energy radiation produced by a second adjacent gamma radiation absorbing layer or any other source. In operation, the breast is located between the gamma camera/detector and shield. Gamma radiation emitted by the radiopharmaceutical-containing breast impinges the gamma camera for measurement and simultaneously penetrates the gamma permeable layer and is absorbed by the gamma radiation absorbing layer. Fluorescence produced upon absorption of the gamma radiation is inhibited from reintroduction into the gamma camera by absorption in the first gamma permeable layer that absorbs this secondary radiation. Gamma or other potentially interfering radiation entering the system from beyond the gamma radiation absorbing layer is similarly absorbed and any secondary fluorescent radiation produced therein absorbed by the first gamma permeable layer.

12 Claims, 2 Drawing Sheets

GAMMA RADIATION ISOLATION SHIELD AND METHOD OF USE

FIELD OF THE INVENTION

The present invention relates to improved high resolution/small field-of-view gamma camera systems for use in breast cancer and similar anatomical imaging, and more specifically, to shielding devices for such gamma detectors that eliminate the influence of stray/interfering radiation that may be present in the imaging environment.

BACKGROUND OF THE INVENTION

X-ray mammography is the primary clinical screening tool for breast cancer. Over 15 million mammograms were performed in 1995 and over 25 million are expected to be performed annually by 2000. However mammography suffers from a high false positive rate. Currently, biopsies are performed following a positive mammogram to determine whether a suspicious lesion is cancerous or benign. Of the approximately 800,000 biopsies performed in 1995, roughly 600,000 were conducted on benign lesions. In addition to the expense involved, biopsy is a stressful procedure for the patient and the scarring left by the biopsy makes subsequent mammograms more difficult to interpret. Additionally, about 15–25% of all women have breast tissue that results in indeterminate mammograms. Dense tissue and scarring from prior surgery have x-ray densities similar to breast lesions, resulting in low contrast mammograms that are difficult to interpret.

Scintimammography has been shown to complement mammography by imaging the metabolic activity of cancerous lesions while ignoring benign lesions and healthy tissue. In studies conducted over the past five years involving 600 women, in connection with the approval process of the DuPont Merck Pharmaceutical Company imaging agent Miraluma™, it was concluded that scintimammography is useful in differentiating cancerous and benign lesions. However, the studies also concluded that current large field-of-view gamma cameras cannot reliably image breast lesions smaller than 1.2–1.5 cm. In addition, the large size of these cameras limits their use to the lateral (side) views and does not allow for imaging the breast from other desirable viewing angles, and lesions in the chest wall are very difficult to detect.

To meet this need, so-called mini gamma cameras that are high resolution and image a small field-of-view have and are being developed.

A problem with these cameras, as with virtually all gamma emission detection based camera systems, is that they are prone to interference from extraneous radiation generated by sources other than the particular anatomical portion being examined. For example, in a typical breast examination, the patient is injected with a radiopharmaceutical and each breast imaged separately from a variety of positions by placing a gamma sensitive camera at various locations relative to the breast. In a lateral examination, the camera is placed outside of the breast under examination which results in its being "aimed" not only at the breast under examination, but also at the opposing breast. Since the opposing breast may also have selectively absorbed some of the radiopharmaceutical, it is also emitting gamma radiation that may be detected by the camera aimed at the breast under examination. While gamma cameras conventionally include collimators whose purpose is to eliminate "stray" radiation not impacting the camera at about a 90° angle to the surface of the collimator, the location of the opposing breast at about 90° to the collimator surface results in the collimator being relatively ineffective in eliminating this source of radiation. Similarly, when a caudal cranial view is taken (from below the breast) gamma emissions from radiopharmaceutical absorbed in the brain or thyroid may result in the production of similar interfering radiation that adversely affects the accuracy of the breast examination currently being performed.

Additionally, scatter radiation from tables and other structures in the environs of the imaging operation can result in the generation of impacting radiation that adversely affects the accuracy of the imaging operation. This problem is particularly acute in the case when the patient under examination is in the seated position as is often the case to enable the patient to remain motionless during the approximate 10 minute interval required to acquire the necessary image.

SUMMARY OF THE INVENTION

According to the present invention, there is provided an adjustable gamma radiation isolation shield that effectively shields the gamma camera from potentially interfering radiation emitted from sources other than the particular anatomical portion under examination. The shield is placed adjacent to the breast or other body portion under examination on the side thereof opposite that addressed by the gamma camera i.e., at about 90° to the field of view of the camera, that is in a parallel plane to the plane of the camera. The shield comprises a first gamma ray permeable layer capable of absorbing fluorescent low energy radiation produced by a second adjacent gamma radiation absorbing layer. In operation, the breast is located between the gamma camera/detector and shield. Gamma radiation emitted by the radiopharmaceutical-containing breast impinges the gamma camera for measurement and simultaneously penetrates the gamma permeable layer and is absorbed by the gamma radiation absorbing layer. Fluorescence produced upon absorption of the gamma radiation is inhibited from reintroduction into the gamma camera by absorption in the first gamma permeable layer that absorbs this secondary radiation. Gamma or other potentially interfering radiation entering the system from beyond the gamma radiation absorbing layer is similarly absorbed and any secondary fluorescent radiation produced therein absorbed by the first gamma permeable layer. In this fashion, the gamma camera is effectively isolated from the potential impact of all extraneous radiation that might affect the accuracy or validity of the imaging operation.

DETAILED DESCRIPTION

Figure 1:
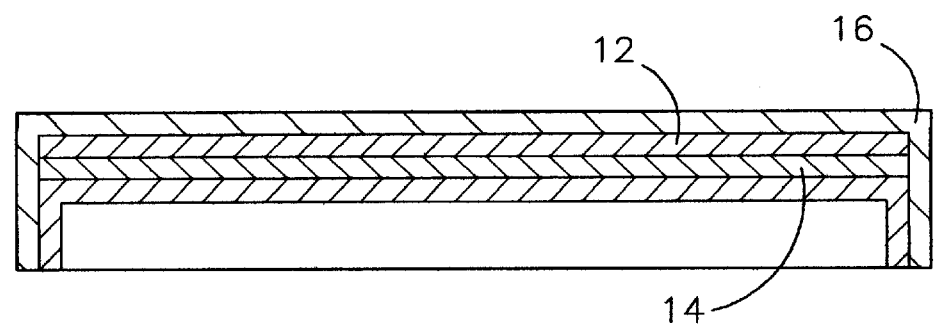
FIG. 1 is a cross-sectional view of the gamma isolation shield of the present invention.

As shown in FIG. 1, the gamma isolation shield 10 of the present invention comprises a first gamma radiation permeable, low energy radiation impermeable layer 12 and a second gamma radiation impermeable layer 14. First layer 12 is always oriented toward the gamma camera or detector as will be described more fully below. Both of layers 12 and 14 are contained in an anatomically inert material 16 such as glass or a plastic, for example a translucent vinyl material container or even embedded in a suitable polymeric material such as a polyethylene or polypropylene matrix. All such containment mechanisms are referred to herein as "containers". The only requirements for the material 16 are that it be capable of retaining layers 12 and 14, cause no interference with any images being acquired and be inert to any anatomical tissue that comes into contact with it. From a comfort standpoint, a plastic material that is highly transparent to gamma radiation and feels warm to the touch when applied to the skin is highly desirable.

First gamma permeable, low energy radiation impermeable layer 12 may comprise any material that absorbs secondary emission florescent radiation. This property is necessary because the incidence of gamma radiation on gamma radiation absorbing layer 14 after passing through layer 12 or incident on layer 14 from some other direction will result in the generation of low energy fluorescent radiation that must be absorbed so that it does not interfere with the imaging process. Layer 12 preferably comprises an appropriate thickness of copper sheet, in the case where technetium-99m is used as the gamma source. In this instance, a copper layer on the order of 3 mm in thickness is entirely suitable. The thickness and composition of layer 12 will of course depend upon the particular gamma emitting radiopharmaceutical with which the patient has been injected and the nature of the secondary low energy radiation generated by absorption of the gamma radiation in layer 14 which, in turn will depend upon the composition of layer 14. These requirements are readily calculable by the skilled artisan by equating the inverse natural logarithm raised to the power of the product of the density of a candidate material times the mass attenuation coefficient of the candidate material times the thickness of the material to the desired attenuation of the secondary low energy radiation that must be contained, given the particular composition of layer 14 and the gamma source being used.

Second gamma radiation absorbing layer 14 may comprise any material suitable for such an application. The specific composition and the thickness thereof required in a particular application will be similarly dependent upon the energy and nature of the gamma radiation emitted by the specific radiopharmaceutical with which the patient has been injected. According to preferred embodiments of the present invention, layer 14 comprises lead, tungsten or bismuth. According to a highly preferred embodiment wherein technetium-99m is the gamma emitter used, layer 14 comprises a sheet of lead about 3 mm in thickness. Dimensionally, gamma isolation shield 10 is roughly coextensive with the field of view of the detector or camera used as described in connection with FIG. 2 below.

Layers 12 and 14 may comprise simply two individual sheets of selectively absorbent material in juxtaposition or the sheets may be separated by some suitable spacer as shown in FIG. 1 where layers 12 and 14 are embedded in a polymeric matrix. As described below, layers 12 and 14 should be at least co-extensive with the line of sight 28 of gamma camera 18 depicted in FIG. 2 to achieve optimum effectiveness.

Figure 2:
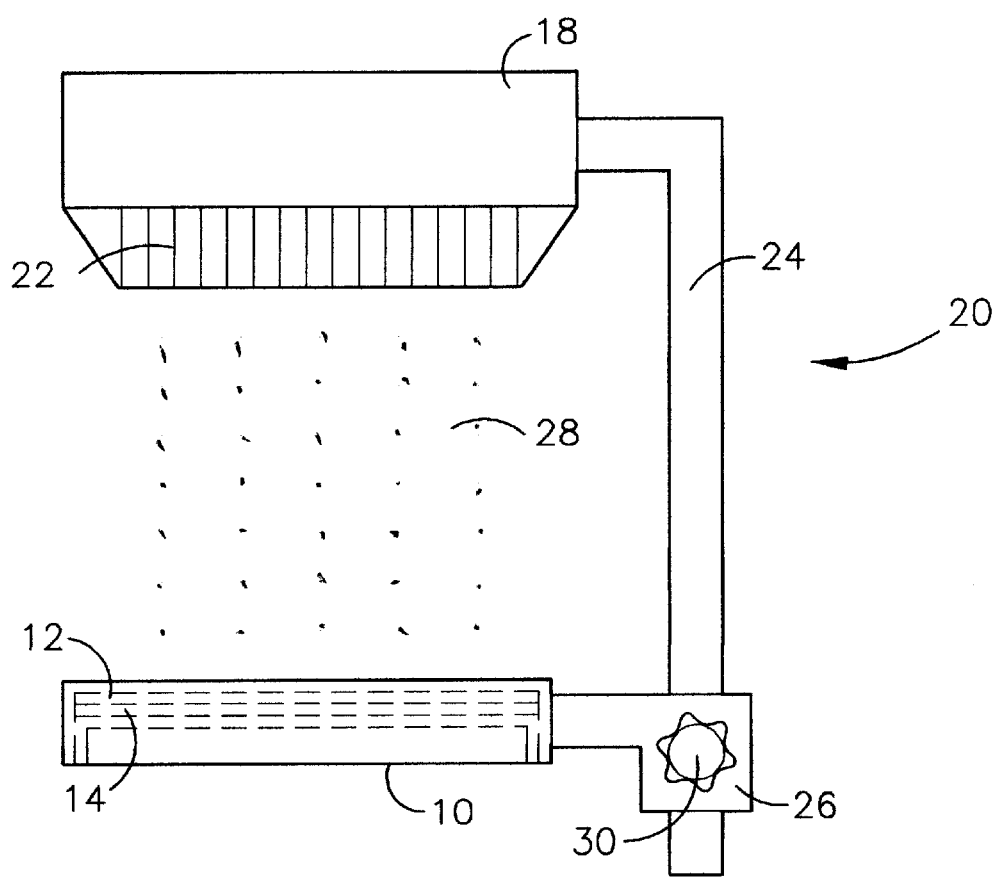
FIG. 2 is a side view of a gamma camera breast imaging system incorporating the gamma isolation shield of the present invention.

As shown in FIG. 2, gamma isolation shield 10 is utilized in an imaging system by suitable attachment 20 to a gamma detector or camera that includes a collimator 22. According to a preferred embodiment of the present invention, attachment 20 comprises a bracket 24 that is removably attached to gamma camera 18. Gamma isolation shield 10 is in turn attached to a suitable moveable arm 26 that engages bracket 24 that can be slideably, by gear engagement action or otherwise, moved up and down on bracket 24 to change its position relative to camera 18 and collimator 22. It should be noted that the wide dimension of gamma isolation shield 10 always stays at an approximate 90° angle relative to the line of sight 28 of gamma camera 18 and is preferably generally co-extensive with line of sight 28. In the case where arm 26 slideably engages bracket 24, a frictional tightening wheel 30 is provided.

Figure 3:
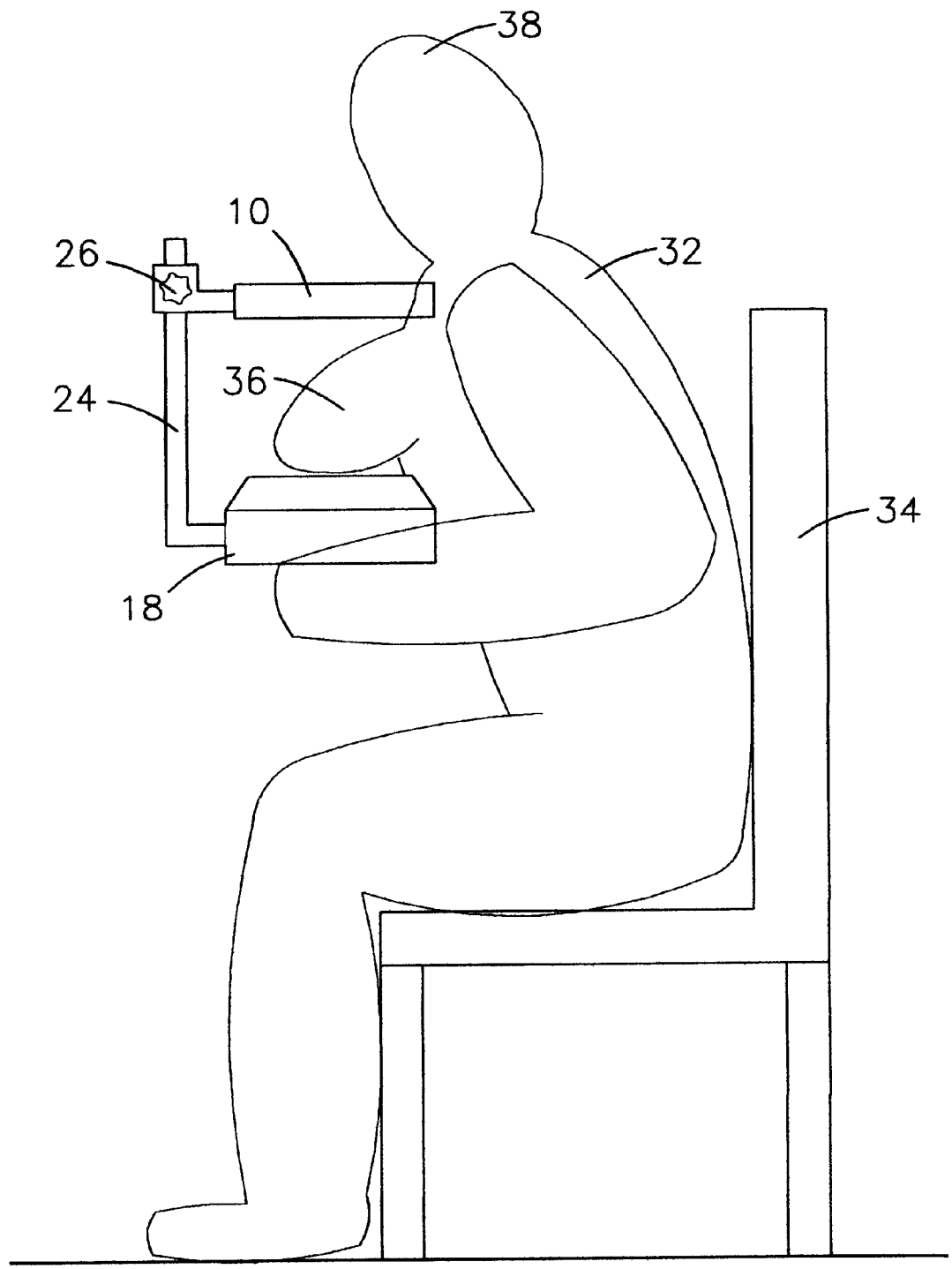
FIG. 3 is a side view showing the positioning of the gamma isolation shield of the present invention in the production of a caudal cranial view of a female breast.

Use of the gamma isolation shield of the present invention in one orientation is depicted in FIG. 3. As shown in this Figure, a patient 32 who has been previously injected with a suitable radiopharmaceutical is seated in a chair 34 with the breast 36 atop gamma camera 18 that includes collimator 22 (not shown in this figure). Gamma isolation shield 10 attached to gamma camera 10 via bracket 24 and arm 26 is positioned on the side of breast 36 opposite gamma camera 18. Gamma isolation shield 10 is then advanced toward gamma camera 18 until breast 36 is immobilized. It is worthy of note here that the level of compression required in this instance is significantly less than that generally required for a typical mammographic examination, thus resulting in a more comfortable condition for the patient during examination. Breast 36 is then exposed to gamma camera 18 for the required interval, generally about 10 minutes. Interfering gamma radiation such as that which might be emitted from the patients head i.e. brain, due to absorption of the radiopharmaceutical by the brain after injection, is absorbed by gamma absorbing layer 14 before it can enter gamma camera 18 through collimator 22. Similarly any gamma radiation that is emitted from breast 36 in the direction of gamma isolation shield 10 passes through layer 12 and is absorbed by layer 14. Secondary low energy fluorescent radiation produced in layer 14 by absorption of gamma radiation is then captured by layer 12 and not permitted to reach gamma camera 18.

There has thus been described a novel gamma isolation shield for application in connection with a gamma detector or camera radiological examinations which shield inhibits the permeation of any potentially interfering radiation into the field of view of the gamma camera or detector. The gamma isolation shield of the present invention is non-obstructing to the radiological examination and, indeed, provides an additional comfortable supporting structure during the examination procedure.

As the invention has been described, it will be apparent to those skilled in the art that it may be varied in many ways without departing from the spirit and scope of the invention. Any and all such modifications are intended to be included within the scope of the appended claims.

What is claimed is:

1. A gamma radiation isolation shield device for attachment to a gamma detector or camera having a field of view comprising:

A) a bracket for attachment to the gamma detector or camera;

B) a gamma radiation isolation shield moveably mounted on said bracket and comprising:

1) a first gamma radiation permeable, low energy radiation impermeable layer juxtaposed with;

2) a second gamma radiation impermeable layer;

the gamma radiation isolation shield extending at right angles to the field of view of the gamma camera or detector and approximately coextensive with the field of view of the gamma camera or detector and such that the first gamma permeable, low energy radiation impermeable layer faces the gamma camera or detector when the device is attached to the gamma camera or detector.

2. The gamma isolation shield device of claim 1 wherein said first and second layers are contained in an anatomically inert gamma radiation permeable container.

3. The gamma radiation isolation shield of claim 2 wherein said first layer comprises a sheet of copper and said second layer comprises a sheet of lead.

4. The gamma radiation isolation shield of claim 2 wherein said second layer comprises a sheet of a member selected from the group consisting of lead, tungsten and bismuth.

5. The gamma radiation isolation shield of claim 4 wherein said first layer comprises a sheet of copper.

6. The gamma radiation isolation shield of claim 5 where said first and second layers are about 3 mm in thickness.

7. A method for acquiring a radiological image of an anatomical portion of a patient injected with a radiopharmaceutical comprising:
  I) placing the anatomical portion under examination into a gamma radiation imaging system comprising:
    a) a gamma radiation camera or detector having a field of view;
    b) a bracket attached to the gamma detector or camera;
    c) a gamma radiation isolation shield moveably attached to the bracket and comprising:
      1) a first gamma radiation permeable, low energy radiation impermeable layer juxtaposed with;
      2) a second gamma radiation impermeable layer; the gamma radiation isolation shield extending at right angles to the field of view of the gamma camera or detector and at least coextensive with the field of view of the gamma camera or detector and such that the first gamma permeable, low energy radiation impermeable layer faces the gamma camera or detector; and
  II) imaging the anatomical portion with the gamma radiation camera or detector.

8. The method of claim 7 wherein said first and second layers are contained in an anatomically inert gamma radiation permeable container.

9. The gamma radiation isolation shield of claim 8 wherein said first layer comprises a sheet of copper and said second layer comprises a sheet of lead.

10. The gamma radiation isolation shield of claim 8 wherein said second layer comprises a sheet of a member selected from the group consisting of lead, tungsten and bismuth.

11. The gamma radiation isolation shield of claim 10 wherein said first layer comprises a sheet of copper.

12. The gamma radiation isolation shield of claim 11 wherein said first and second layers are about 3 mm in thickness.

* * * * *